United States Patent [19]

McCreery

[11] 4,340,324
[45] Jul. 20, 1982

[54] CUTTING INSERT

[75] Inventor: James F. McCreery, Latrobe, Pa.

[73] Assignee: Kennametal Inc., Latrobe, Pa.

[21] Appl. No.: 181,965

[22] Filed: Aug. 28, 1980

[51] Int. Cl.³ .............................................. B26D 1/00
[52] U.S. Cl. ..................................................... 407/114
[58] Field of Search ............................... 407/114, 115

[56] References Cited

U.S. PATENT DOCUMENTS

| 3,399,442 | 9/1968 | Jones et al. | 407/114 |
| 3,968,550 | 7/1976 | Gehri | 407/114 |
| 4,056,871 | 11/1977 | Bator | 407/114 |

*Primary Examiner*—Leonidas Vlachos
*Attorney, Agent, or Firm*—Lawrence R. Burns

[57] ABSTRACT

A cutting insert for the metalworking industry is disclosed having a cutting edge, a land area, a descending wall and a sloping wall that joins a planar floor in the central portion of the insert. The cutting insert is polygonal when viewed in plan and has rounded corners joining the sides of the insert. The insert has at least two angularly related cutting edges defining a plane. The perpendicular distance between the plane defined by the cutting edges and the point where the descending wall joins the sloping floor is at a minimum in the corner areas and at a maximum intermediate the adjacent corners of the insert.

11 Claims, 4 Drawing Figures

CUTTING INSERT

BACKGROUND OF THE INVENTION

This invention concerns cutting inserts for the metalworking industry and is especially concerned with an indexable cemented carbide cutting insert used with toolholders for removing material from metal workpieces.

Cutting insert designs and configurations are many in the metalworking art. Some of the more recent configurations may be seen by a review of the McCreery et al U.S. Pat. No. 3,973,307. This patent disclosed a new style cutting insert that recognized that chip control could be effected without the use of molded chipbreaker grooves or superstructures that would impede the flow of the chip and increase the horsepower requirements.

The cutting insert disclosed by McCreery et al had a cutting edge, land area, descending wall and a planar floor, each having a certain relation to the other. A similar insert, but having a molded chipbreaker groove, was also shown in the McKelvey U.S. Pat. No. 3,733,664.

Other cutting tool configurations may be reviewed, such as the cutting tool configuration of Klopstock, disclosed in U.S. Pat. No. 1,756,516, granted in 1930. The tool configuration was for a single piece tool long before cemented carbides and indexable inserts came into existence and, further, Klopstock did not disclose all the relevant features and the relationship of one to another to effectively control chips being broken as they are removed from a metal workpiece.

BRIEF SUMMARY OF THE INVENTION

According to the present invention, a hard wear resistant cutting insert, preferably, a molded insert which is made, for example, from a cemented hard metal carbide, ceramic, or the like, is provided with a configuration for more efficiently removing metal.

More specifically, an insert according to the present design is subject to less wear by abrasion and wash out in the corner or nose area than previous inserts of the designs exemplified by FIG. 7 of McCreery et al U.S. Pat. No. 3,973,307. The present insert design produces a larger diameter chip at heavier feeds, thereby reducing power consumption. In addition, as the depth of cut increases, the chips produced take on a conical form which helps reduce power consumption and crater wear. This insert design also helps to control the direction in which the chips fly as they leave the inserts.

The cutting insert according to the present invention has a polygonal body having top and bottom faces and a peripheral wall with rounded corners joining said top and bottom faces. Cutting edges are formed at the juncture of the peripheral wall and at least one of the top and bottom faces. There are at least two angularly related cutting edges joined by a rounded corner and defining a plane. Behind and joined to each cutting edge is a land area that extends inwardly into the polygonal body. At the inner edge of the land area, a descending wall extends away from the land area and forms a first acute included angle with the plane of the cutting edges. This descending wall terminates in a sloping floor which descends as it extends inwardly of the insert body. The sloping floor forms a second acute included angle with the plane defined by the cutting edges. The sloping floor may then terminate in a planar floor which is substantially parallel to the plane defined by the cutting edges or extend to the center of the insert.

The cutting insert is preferably designed such that the first included angle in the corner is greater than the first included angle in areas away from the corner.

It is also preferable that the perpendicular distance from the plane of the cutting edges to the point where the descending wall joins the sloping floor is smallest in the corner and greatest intermediate adjacent corners of the polygonal body.

It is also preferable that the second acute angle is smaller than the first acute angle.

In the preferred embodiment of this invention, the descending wall in the corner areas meets the sloping floor along an arc-like line. Intermediate adjacent corners, the descending wall meets the sloping floor along a line which joins the arc-like line formed in the corner area in a substantially tangential manner.

In its more preferred embodiments, the first included angle in the corner areas of said polygonal body should be between 20 to 35 degrees while in the areas of the descending wall located away from said corners it is 10 to 25 degrees, but always less than it is in the corner area in inserts designed for low feed rates. In inserts designed to take heavy feeds, both angles should be equal and be within the range of 10 to 25 degrees. It is also preferable that the perpendicular distance from the plane of the cutting edges to the plane of the planar floor be between 0.008 to 0.030 inches, while the perpendicular distance from the plane of the cutting edges to the point where the descending wall joins the sloping floor is between 0.003 to 0.030 inches.

With the foregoing in mind, it is a primary objective of this invention to provide a cutting insert which is more efficient in that it requires less power.

It is also an objective of this invention to provide a cutting insert which is less subject to wear by abrasion and wash out in the corner area.

It is also an objective of this invention to provide an insert which produces a conical chip at the greater depths of cut and directs these chips in a controlled direction.

BRIEF DESCRIPTION OF THE DRAWINGS

The exact nature of the present invention will become more clearly apparent upon reference to the following detailed specification taken in connection with the accompanying drawings in which.

DETAILED DESCRIPTION OF THE INVENTION

Figure 1:
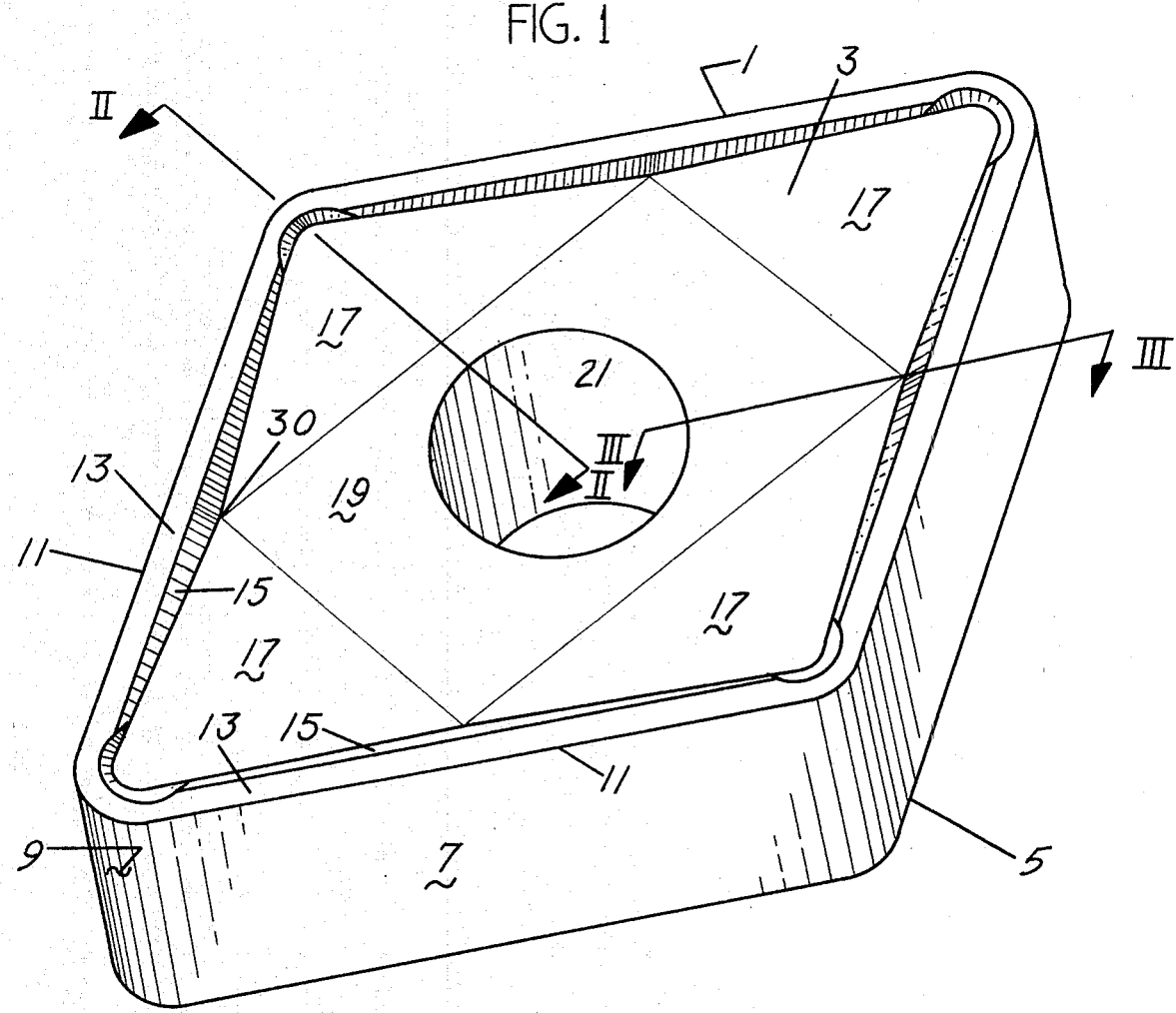
FIG. 1 is a perspective view of a cutting insert according to the present invention.
Figure 2:
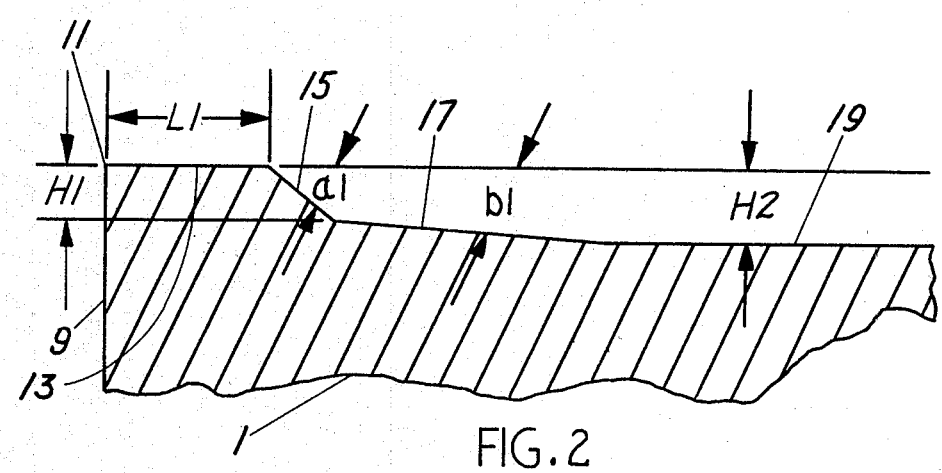
FIG. 2 is a sectional view of the insert and is indicated by lines II—II in FIG. 1.

Referring to the drawings somewhat more in detail, shown in FIGS. 1 and 2 is a hard wear resistant cutting insert having a polygonal body 1 with a top 3 and bottom faces 5 and a peripheral wall 7 with rounded corners 9 joining the top face 3 and bottom face 5. Cutting edges 11 are formed at the juncture of the peripheral wall 7 and at least one of the top 3 and bottom 5 faces.

There are at least two angularly related cutting edges 11 joined by rounded corner 9. These two cutting edges define a plane in space.

Behind and joined to each cutting edge 11 is a planar land area 13 that extends inwardly into the polygonal body of the insert. At the inner edge of the land 13 is a descending wall 15 which extends away from the land area 13 and forms a first acute included angle a1 with the plane of the cutting edges 11. This descending wall 15 terminates in a sloping floor 17 which descends as it extends inwardly of the insert body 1. The sloping floor 17 forms a second acute included angle b1 with the plane defined by the cutting edges 11. More preferably, sloping floor 17 defines a plane which has been rotated through an angle b1 about an axis X which is perpendicular to a vertical plane containing the bisector of the corner angle c formed by adjacent edges 11 (see FIG. 4).

The sloping floor 17 may then terminate in a planar floor 19 which is substantially parallel to the plane defined by the cutting edges or it may extend all the way to hole 21 without encountering a planar floor (not shown). The planar floor 19 is generally centrally located on the top face 3 of the insert and centrally located within the planar floor 19 is a hole 21 which passes through the thickness of the cutting insert 1. Hole 21 would be engaged with an insert pin (not shown) to hold the insert onto a cutting tool.

The cutting insert 1 is preferably defined such that the first included angle a1 in the corner is greater than the first included angle in areas away from the corner. It is also preferable that the perpendicular distance H1 from the plane of the cutting edges 11 to the point where the descending wall 15 joins the sloping floor 17 is smallest in the corner 9 and greatest intermediate the adjacent corners 9 of the polygonal body 1. It is also preferable that the second acute angle b1 is smaller than the first acute angle a1, as shown in FIG. 2.

Figure 4:
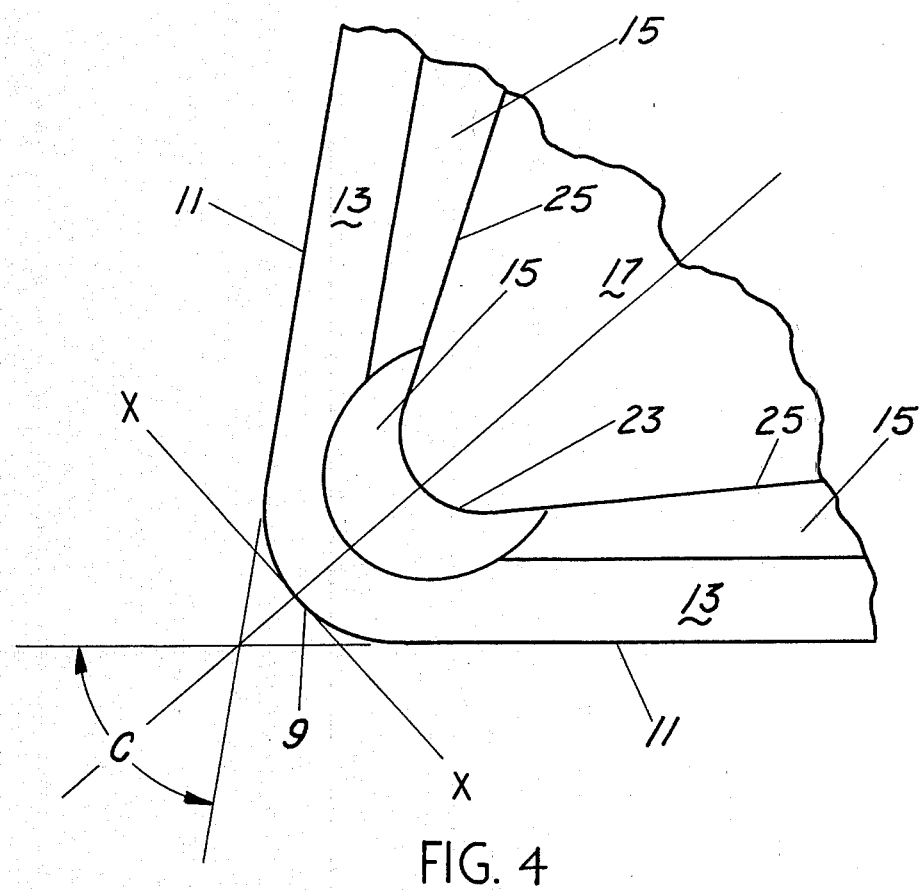
FIG. 4 is an enlarged fragmentary top view of a corner of a cutting insert according to the present invention.

Viewing FIG. 4, which is a fragmentary enlarged top view of one of the corners of the insert 1, it can be seen that the descending wall 15 in the corner area meets the sloping floor 17 along an arc-like line 23. Intermediate adjacent corners 9, the descending wall 15 meets the sloping floor 17 along a substantially straight line 25 which joins the arc-like line 23 formed in the corner area 9 in a substantially tangential manner.

Figure 3:
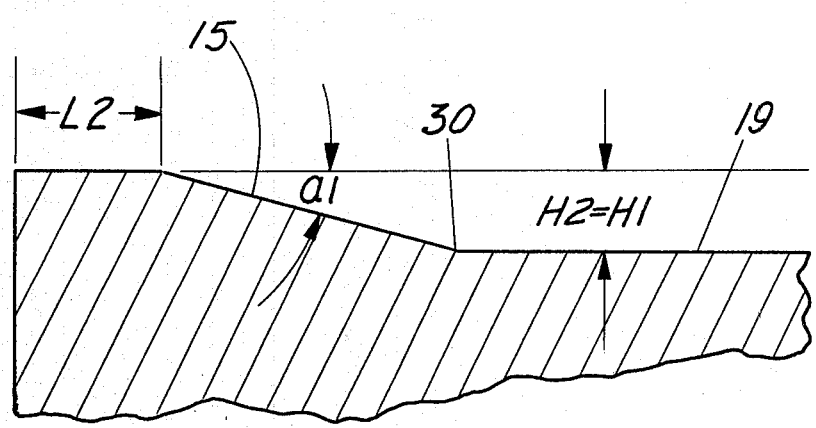
FIG. 3 is a sectional view of the insert and is indicated by lines III—III in FIG. 1.

FIGS. 2 and 3, respectively, show sectionalized views of the corner area and an area intermediate two adjacent corners.

In FIG. 2, it can be seen that the first included angle a1 in the corner area 9 of the polygonal body 1 should be between 20 to 35 degrees while, in the areas of the descending wall located away from said corners, as shown in FIG. 3, the angle a1 should be 10 to 25 degrees, but it should always be less than it is in the corner area 9 for inserts designed for light feed rates. Most preferably, angle a1 in the corner area is 24 to 28 degrees and angle a1 intermediate adjacent corners is 14 to 18 degrees. Inserts designed to take heavy rates of feed, these two angles should be equal and within the range of 10 to 25 degrees and, most preferably, 14 to 18 degrees.

It is also preferable that the perpendicular distance H2 from the plane of the cutting edges 11 to the plane of the planar floor 19 be between 0.008 to 0.030 inches while the perpendicular distance H1 from the plane of the cutting edges to the point where the descending wall 15 joins the sloping wall 17 is between 0.003 to 0.030 inches. More preferably, H2 should be 0.010 to 0.015 inches while H1 is 0.003 to 0.015 inches. In the corner area, H1 is most preferably 0.003 to 0.007 inches. It should be noted that while H1 may not be greater than H2, it does, however, equal H2 at point 30 where descending wall 15, sloping floor 17, and planar floor 19 meet (see FIG. 3).

The distance L1 representing the width of the land area in the corner area 9 is narrower than the width of the land area L2 intermediate adjacent corners for inserts designed for light feed rates. L1 and L2 have a value of between 0.003 to 0.050 inches. Most preferably, in the corner area 9, L1 is between 0.003 to 0.007 inches, and in the region intermediate adjacent corner areas L2, is preferably 0.010 to 0.015 inches. In inserts designed for heavy feed rates, L1 should equal L2 and have a value between 0.010 and 0.050 inches, most preferably, 0.010 to 0.015 inches.

Inserts designed with a combination of features in accordance with the preceding detailed description should efficiently remove metal and have superior resistance to wear by abrasion and wash out in the corner areas. In addition, as the depth of cut increases, the chips produced take on a conical form which helps reduce power consumption and crater wear. Furthermore, this insert design also helps to control the direction in which chips are thrown.

Modifications may be made within the scope of the appended claims.

What is claimed is:

1. A cutting insert which comprises: a polygonal body having top and bottom faces and a peripheral wall with rounded corners joining said top and bottom faces; cutting edge means formed at the juncture of said peripheral wall and at least one of said top and bottom faces; said cutting edge means comprising at least two angularly related cutting edges defining a plane with said rounded corners joining said cutting edges to one another; a land area joining said cutting edge and extending inwardly of said polygonal body; a descending wall that extends away from, and is joined to said land area, forms a first acute included angle with the plane of said cutting edges and terminates in a sloping floor area that descends as said sloping floor extends inwardly of said body and forms a second acute included angle with said plane defined by said cutting edges, said first included angle being greater in said corner than in areas away from said corner, and the perpendicular distance from the plane of said cutting edges to the point where the descending wall joins the sloping floor being smallest in the corner and greatest intermediate the adjacent corners.

2. A cutting insert according to claim 1 wherein said second acute angle is smaller than said first acute angle.

3. A cutting insert according to claim 2 in which said first included angle is in the range of from 20 to 35 degrees in the corners of said polygonal body.

4. A cutting insert according to claim 2 in which said first included angle is 10 to 25 degrees in areas of the descending wall located away from said corners of said polygonal body.

5. A cutting insert according to claim 2 in which the perpendicular distance from the plane of the cutting edges to the plane of said planar floor is in the range of 0.008 to 0.030 inches.

6. A cutting insert according to claim 2 or 5 in which the perpendicular distance from the plane of said cutting edges to the point where the descending wall joins the sloping floor is in the range of from 0.003 to 0.030 inches.

7. A cutting insert according to claim 6 wherein in said corner area said perpendicular distance from the plane of said cutting edges to the point where the descending wall joins the sloping floor is 0.003 to 0.015 inches.

8. A cutting insert according to claim 2 wherein said descending wall meets said sloping floor along an arc-like line in said corner area.

9. A cutting insert according to claim 8 wherein said descending wall intermediate adjacent corners meets said sloping floor along a line which joins said arc-like line in said corner area in a substantially tangential manner.

10. A cutting insert according to claim 9 wherein said land area has a width within the range of 0.003 to 0.050 inches with the land width in the corners being narrower than the land width intermediate adjacent corners.

11. A cutting insert according to claim 2 wherein said sloping floor terminates in a planar floor that is substantially parallel to the plane defined by said cutting edges.

* * * * *